US012122421B2

(12) United States Patent
Molinari et al.

(10) Patent No.: US 12,122,421 B2
(45) Date of Patent: Oct. 22, 2024

(54) METHOD FOR IMPROVING TEMPORAL CONSISTENCY OF PLANNED MANEUVERS

(71) Applicant: TOYOTA RESEARCH INSTITUTE, INC., Los Altos, CA (US)

(72) Inventors: Daniele Molinari, Redwood City, CA (US); Constantin Hubmann, Menlo Park, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 629 days.

(21) Appl. No.: 17/322,337

(22) Filed: May 17, 2021

(65) Prior Publication Data

US 2022/0371617 A1 Nov. 24, 2022

(51) Int. Cl.
*B60W 60/00* (2020.01)
*B60W 40/10* (2012.01)

(52) U.S. Cl.
CPC ........ *B60W 60/0011* (2020.02); *B60W 40/10* (2013.01); *B60W 60/0021* (2020.02); *B60W 2556/10* (2020.02)

(58) Field of Classification Search
CPC ......... B60W 60/0011; B60W 60/0021; B60W 40/10; B60W 2556/10
See application file for complete search history.

(56) References Cited

U.S. PATENT DOCUMENTS

| 2019/0250617 A1* | 8/2019 | Ford | G05D 1/0212 |
| 2020/0377084 A1 | 12/2020 | Ondruska et al. | |
| 2022/0177000 A1* | 6/2022 | Zadeh | B60W 50/06 |
| 2022/0365540 A1* | 11/2022 | Rosales | G05D 1/617 |

FOREIGN PATENT DOCUMENTS

| KR | 1020180018789 A | 2/2018 |
| KR | 20200124149 A | 11/2020 |

OTHER PUBLICATIONS

Mukadam, et al., "STEAP: simultaneous trajectory estimation and planning", Autonomous Robots, arXiv:1807.10425v1, Jul. 27, 2018.
Yu, et al., "Scene-Graph Augmented Data-Driven Risk Assessment of Autonomous Vehicle Decisions," Aug. 31, 2020.
Ha, et al., "Probabilistic Framework for Constrained Manipulations and Task and Motion Planning under Uncertainty," 2020 IEEE International Conference on Robotics and Automation, 2020.
Jiang, et al., "Robust Calculation of Ego-Vehicle Corridors," Multimedia Imaging Report 34, 2009.

* cited by examiner

*Primary Examiner* — James J Lee
*Assistant Examiner* — Steven Vu Nguyen
(74) *Attorney, Agent, or Firm* — SEYFARTH SHAW LLP

(57) ABSTRACT

A method of motion planning and maneuvering of an ego vehicle is described. The method includes computing a set of potential vehicle maneuvers during a current motion planning cycle of the ego vehicle. The method also includes identifying, for the set of potential vehicle maneuvers, space corridor compatible vehicle maneuvers from a set of previously computed vehicle maneuvers during a previous motion planning cycle. The method further includes prioritizing a currently executed vehicle maneuver when the currently executed vehicle maneuver is a space corridor compatible vehicle maneuver with the set of potential vehicle maneuvers.

15 Claims, 7 Drawing Sheets

METHOD FOR IMPROVING TEMPORAL CONSISTENCY OF PLANNED MANEUVERS

BACKGROUND

Field

Certain aspects of the present disclosure generally relate to autonomous vehicle technology and, more particularly, to improving temporal consistency of planned maneuvers.

Background

Autonomous agents (e.g., vehicles, robots, etc.) rely on machine vision for sensing a surrounding environment by analyzing areas of interest in a scene from images of the surrounding environment. Although scientists have spent decades studying the human visual system, a solution for realizing equivalent machine vision remains elusive. Realizing equivalent machine vision is a goal for enabling truly autonomous agents. Machine vision, however, is distinct from the field of digital image processing. In particular, machine vision involves recovering a three-dimensional (3D) structure of the world from images and using the 3D structure for fully understanding a scene. That is, machine vision strives to provide a high-level understanding of a surrounding environment, as performed by the human visual system.

Autonomous agents, such as driverless cars and robots, are quickly evolving and have become a reality in this decade. Because autonomous agents have to interact with humans, however, many critical concerns arise. For example, how to design vehicle control of an autonomous vehicle using machine learning. Unfortunately, vehicle control by machine learning is less effective in complicated traffic environments involving complex interactions between vehicles (e.g., a situation where a controlled ego vehicle merges/changes onto/into a traffic lane).

Machine learning techniques for vehicle control using a network to select a vehicle control action for an ego vehicle are desired. For example, a selected speed/acceleration/steering angle of the controlled ego vehicle may be applied as a vehicle control action. These conventional machine learning techniques do not identify correspondences between maneuvers computed at different points in time.

SUMMARY

A method of motion planning and maneuvering of an ego vehicle is described. The method includes computing a set of potential vehicle maneuvers during a current motion planning cycle of the ego vehicle. The method also includes identifying, for the set of potential vehicle maneuvers, space corridor compatible vehicle maneuvers from a set of previously computed vehicle maneuvers during a previous motion planning cycle. The method further includes prioritizing a currently executed vehicle maneuver when the currently executed vehicle maneuver is a space corridor compatible vehicle maneuver with the set of potential vehicle maneuvers.

A non-transitory computer-readable medium having program code recorded thereon for motion planning and maneuvering of an ego vehicle is described. The program code is executed by a processor. The non-transitory computer-readable medium includes program code to compute a set of potential vehicle maneuvers during a current motion planning cycle of the ego vehicle. The non-transitory computer-readable medium also includes program code to identify, for the set of potential vehicle maneuvers, space corridor compatible vehicle maneuvers from a set of previously computed vehicle maneuvers during a previous motion planning cycle. The non-transitory computer-readable medium further includes program code to prioritize a currently executed vehicle maneuver when the currently executed vehicle maneuver is a space corridor compatible vehicle maneuver with the set of potential vehicle maneuvers.

A system for motion planning and maneuvering of an ego vehicle is described. The system includes a vehicle maneuver computation module to compute a set of potential vehicle maneuvers during a current motion planning cycle of the ego vehicle. The system also includes a vehicle maneuver compatibility module to identify, for the set of potential vehicle maneuvers, space corridor compatible vehicle maneuvers from a set of previously computed vehicle maneuvers during a previous motion planning cycle. The system further includes a vehicle control selection module to prioritize a currently executed vehicle maneuver when the currently executed vehicle maneuver is a space corridor compatible vehicle maneuver with the set of potential vehicle maneuvers.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
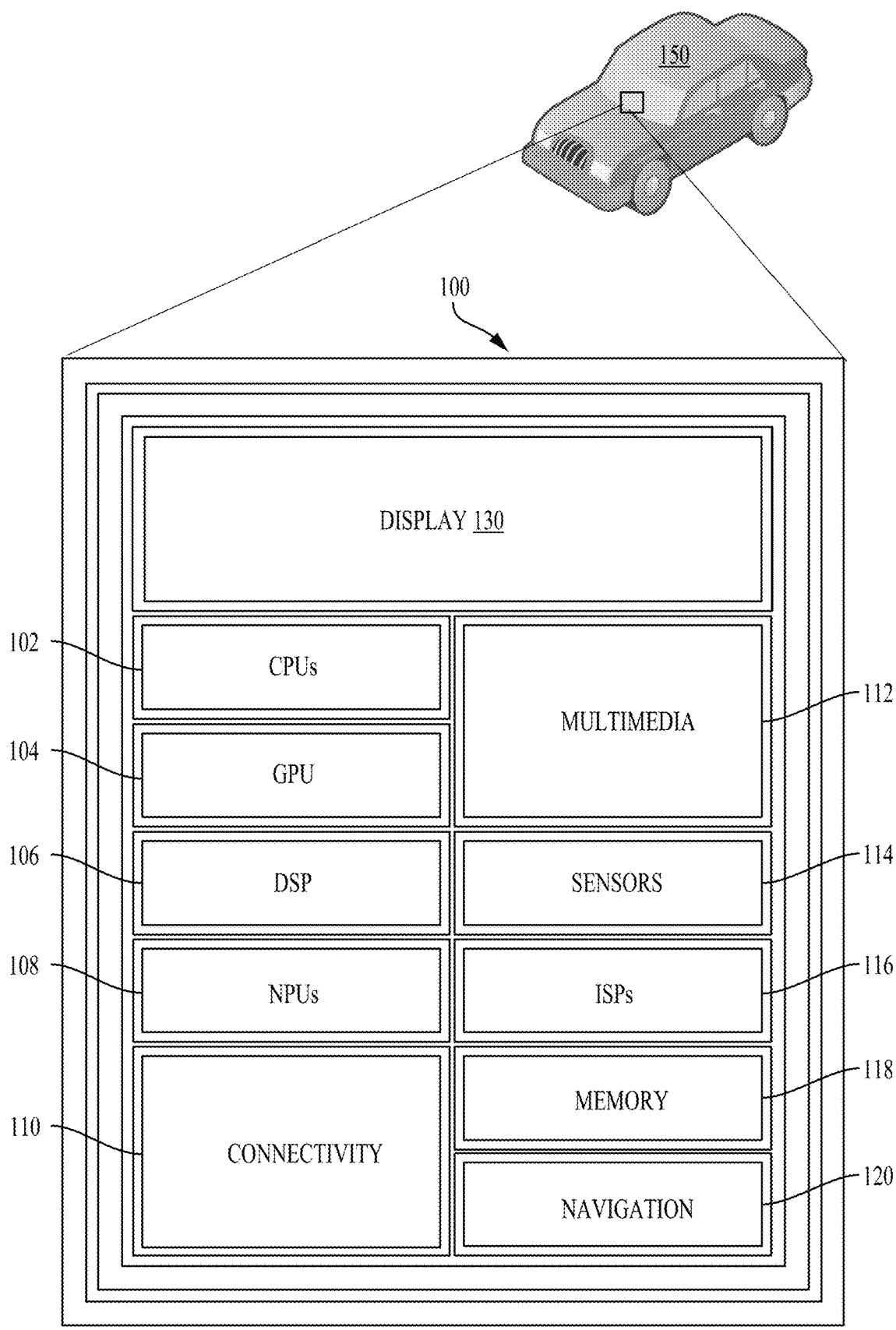
FIG. 1 illustrates an example implementation of designing a neural network using a system-on-a-chip (SOC) for a vehicle behavior control system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Traffic congestion on highways affects millions of people and presents an urgent problem to solve. In particular, vehicles at highway merging sections (e.g., such as on-ramp and land-drop bottlenecks) perform lane changes, which may generate traffic oscillations and extra congestion. Both main-lane and on-ramp traffic are potentially congested due to irregular lane change behavior and unexpected braking maneuvers of surrounding vehicles. Automated vehicles are expected to reduce traffic accidents and improve traffic efficiency. In particular, automation of vehicle control on highways is rapidly advancing, which may eventually reduce traffic accidents and improve traffic efficiency.

Reducing traffic congestion may be achieved by effectively directing timing and speed of ego vehicles. For example, the timing and speed of vehicles is controlled when maneuvering in traffic in a manner that does not detrimentally affect traffic on the roadway. According to one aspect of the present disclosure, a vehicle behavior control system is described for motion planning and maneuvering of a controlled ego vehicle, while reducing the traffic impact on the roadway.

Vehicle control by machine learning may be less effective in complicated traffic environments. For example, these traffic environments may involve complex interactions between vehicles, including situations where a controlled ego vehicle maneuvers into and out of traffic lanes. Conventional machine learning techniques for vehicle control may use a neural network to select an appropriate vehicle control action from input data relative to the ego vehicle. For example, a selected speed/acceleration/steering angle of the controlled ego vehicle may be applied as a vehicle control action to perform a vehicle control maneuver. Unfortunately, conventional machine learning techniques as well as non-artificial intelligence (AI) planning applications do not identify correspondence between maneuvers computed at different points in time for motion planning or maneuvering of an ego vehicle.

For example, when an autonomous vehicle (AV) is driving on a roadway with multiple lanes, conventional approaches plan actions at discrete time intervals, as determined by a vehicle perception system. The vehicle perception system can include a number of different sensors, such as cameras, a light detection and ranging (LIDAR) sensor or a radio detection and ranging (RADAR) sensor, sonar, or other like sensor. Unfortunately, conventional approaches of planning actions at discrete time intervals do not identify correspondences between maneuvers computed at the discrete time intervals.

Aspects of the present disclosure identify relevant correspondences and/or relationships between maneuvers in a drivable space computed at different times to improve motion planning of an autonomous vehicle (AV). The correspondences may be a fallback mechanism that provides extra continuity for a maneuver executed during operation of an ego vehicle. In some aspects of the present disclosure, improving temporal consistency of planned maneuvers may provide continuity for improved operator confidence during operation of the autonomous vehicle. In particular, these aspects of the present disclosure are directed to a fallback mechanism for providing extra continuity assurances for a selected driving maneuver during motion planning.

FIG. 1 illustrates an example implementation of the aforementioned system and method for a vehicle behavior control system using a system-on-a-chip (SOC) 100 of an autonomous vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fifth generation (5G) cellular network technology, fourth generation long term evolution (4G LTE) connectivity, unlicensed WiFi connectivity, USB connectivity, Bluetooth® connectivity, and the like. In addition, a multimedia processor 112 in combination with a display 130 may, for example, apply a temporal component of a current traffic state to select a vehicle behavior control action, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the autonomous vehicle 150. In this arrangement, the autonomous vehicle 150 may include a processor and other features of the SOC 100. In this aspect of the present disclosure, instructions loaded into a processor (e.g., CPU 102) or the NPU 108 of the autonomous vehicle 150 may include program code to determine one or more merge gaps between vehicles in a target lane of a multilane highway based on images processed by the sensor processor 114. The instructions loaded into a processor (e.g., CPU 102) may also include program code to compute an exposure time in which the ego vehicle is specified to merge into the one or merge gaps, and program code to select a merge gap between a first vehicle and a second vehicle in the target lane of the multilane highway having a maximum exposure time.

Figure 2:
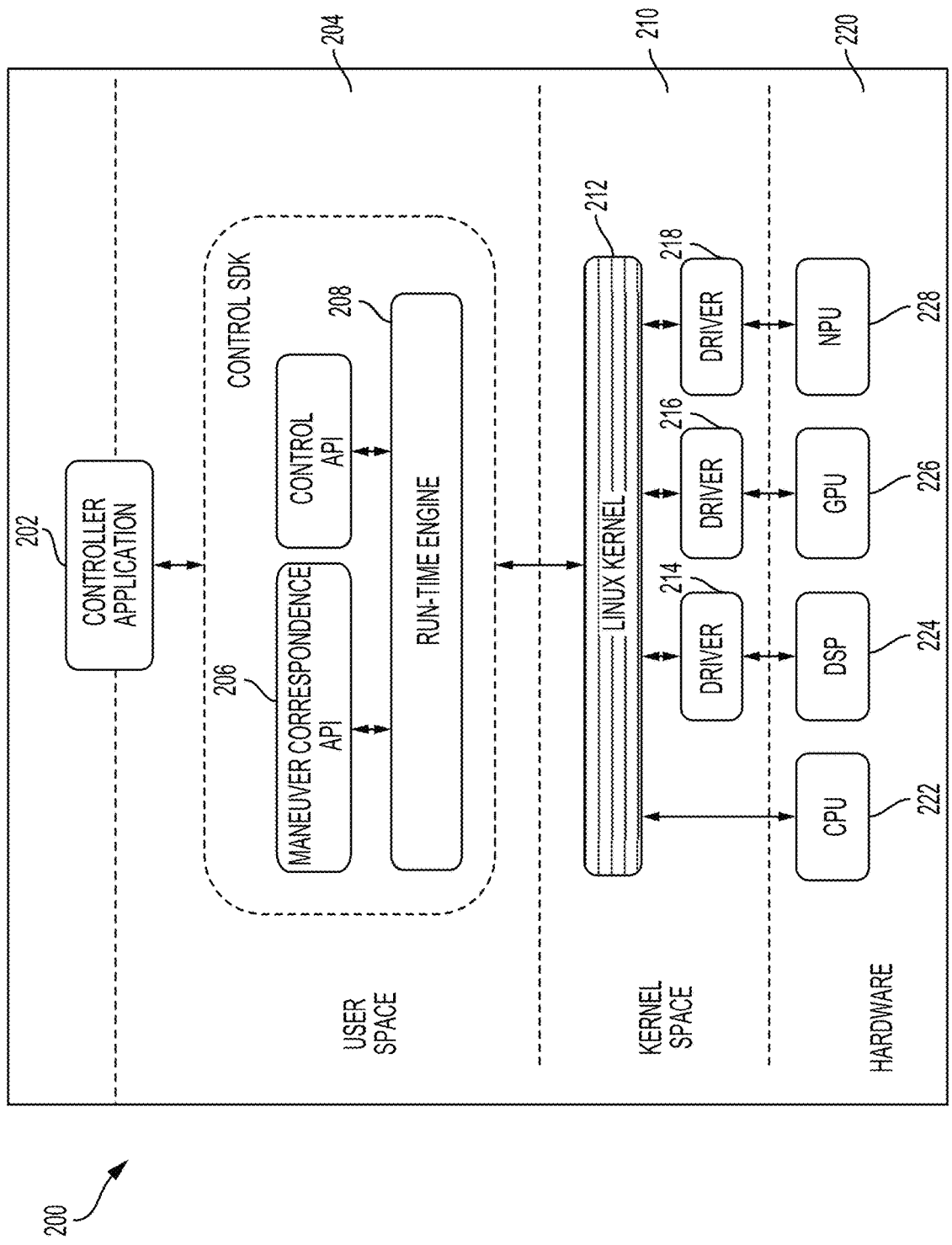
FIG. 2 is a block diagram illustrating a software architecture that may modularize artificial intelligence (AI) functions for a vehicle behavior control system of an autonomous agent, according to aspects of the present disclosure.

FIG. 2 is a block diagram illustrating a software architecture 200 that may modularize artificial intelligence (AI) functions for selecting a vehicle control action of an autonomous agent using temporal consistency of planned maneuvers, according to aspects of the present disclosure. Using the architecture, a controller application 202 may be designed such that it may cause various processing blocks of a system-on-a-chip (SOC) 220 (for example a CPU 222, a DSP 224, a GPU 226, and/or an NPU 228) to perform supporting computations during run-time operation of the controller application 202. While FIG. 2 describes the software architecture 200 for selecting a vehicle control action of an autonomous agent, it should be recognized that vehicle action control functionality is not limited to autonomous agents. According to aspects of the present disclosure, vehicle action control functionality is applicable to any vehicle type, provided the vehicle is equipped with appropriate functions of an advanced driver assistance system (ADAS).

The controller application 202 may be configured to call functions defined in a user space 204 that may, for example, provide for vehicle action control services. The controller application 202 may make a request to compile program code associated with a library defined in a maneuver correspondence application programming interface (API) 206 to perform a vehicle behavior action control selection according to a drivable trajectory. Selection of the vehicle behavior control action may ultimately rely on the output of a neural network (or a non-learning based algorithm) configured to select a vehicle control action of an autonomous agent to maneuver the vehicle along a drivable trajectory using a temporally consistent planned maneuver.

A run-time engine 208, which may be compiled code of a runtime framework, may be further accessible to the controller application 202. The controller application 202 may cause the run-time engine 208, for example, to take actions for controlling the autonomous agent. When an ego vehicle intends to merge onto a traffic lane, the run-time engine 208 may in turn send a signal to an operating system 210, such as a Linux Kernel 212, running on the SOC 220. FIG. 2 illustrates the Linux Kernel 212 as software architecture for implementing control of an autonomous agent using temporal traffic state information. It should be recognized, however, aspects of the present disclosure are not limited to this exemplary software architecture. For example, other kernels may be used to provide the software architecture to support vehicle control action selection functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
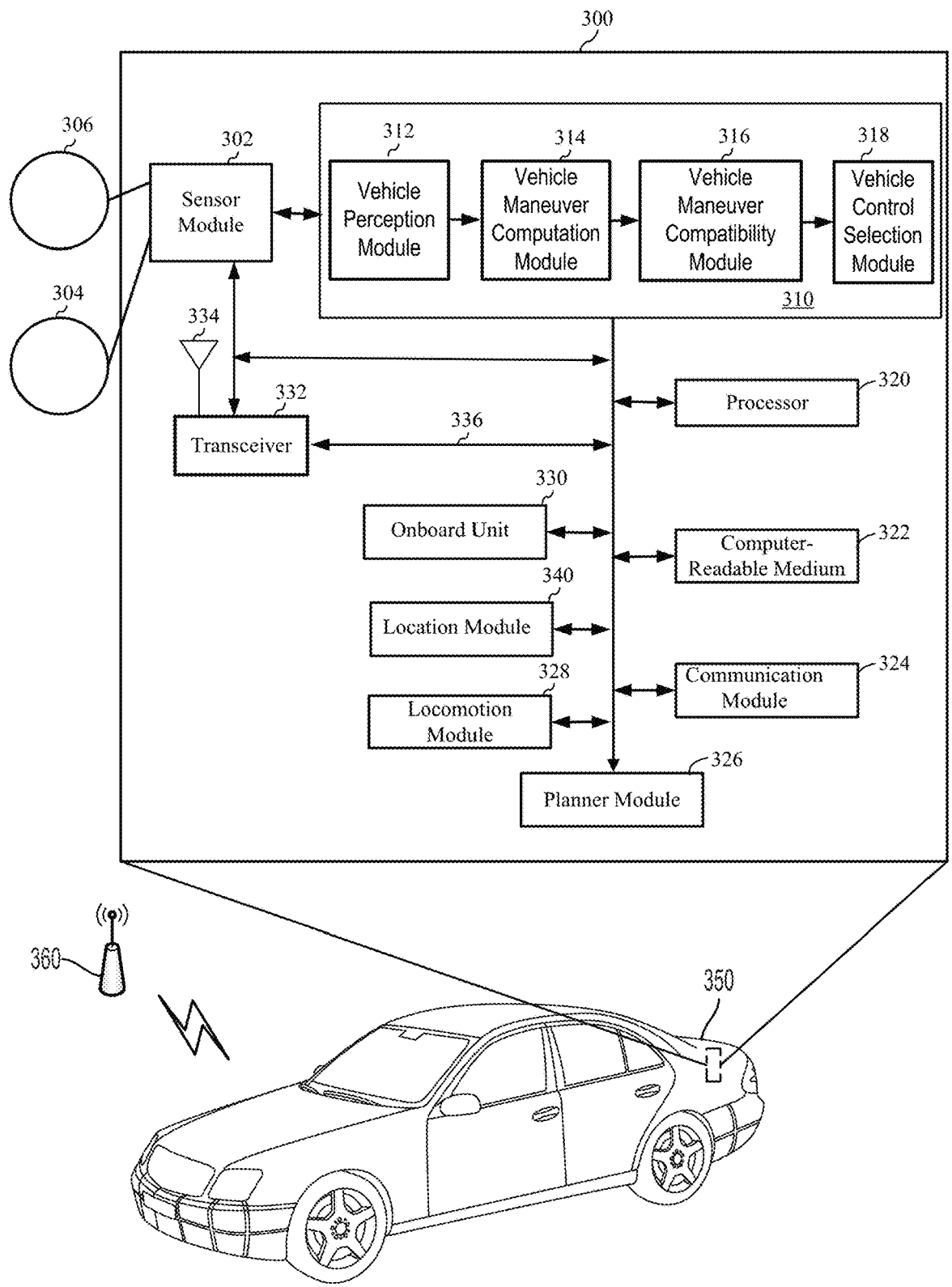
FIG. 3 is a diagram illustrating an example of a hardware implementation for a vehicle behavior control system, according to aspects of the present disclosure.

FIG. 3 is a diagram illustrating an example of a hardware implementation for a vehicle behavior control system 300, according to aspects of the present disclosure. The vehicle behavior control system 300 may be configured for improved temporal consistence of planned maneuvers for an ego vehicle. The vehicle behavior control system 300 may be a component of a vehicle, a robotic device, or other non-autonomous device (e.g., non-autonomous vehicles, ride-share cars, etc.). For example, as shown in FIG. 3, the vehicle behavior control system 300 is a component of a car 350.

Aspects of the present disclosure are not limited to the vehicle behavior control system 300 being a component of the car 350. Other devices, such as a bus, motorcycle, or other like non-autonomous vehicle, are also contemplated for implementing the vehicle behavior control system 300. In this example, the car 350 may be autonomous or semi-autonomous; however, other configurations for the car 350 are contemplated, such as an advanced driver assistance system (ADAS).

The vehicle behavior control system 300 may be implemented with an interconnected architecture, represented generally by an interconnect 336. The interconnect 336 may include any number of point-to-point interconnects, buses, and/or bridges depending on the specific application of the vehicle behavior control system 300 and the overall design constraints. The interconnect 336 links together various circuits including one or more processors and/or hardware modules, represented by a sensor module 302, a vehicle behavior controller 310, a processor 320, a computer-readable medium 322, a communication module 324, a planner module 326, a locomotion module 328, an onboard unit 330, and a location module 340. The interconnect 336 may also link various other circuits such as timing sources, peripherals, voltage regulators, and power management circuits, which are well known in the art, and therefore, will not be described any further.

The vehicle behavior control system 300 includes a transceiver 332 coupled to the sensor module 302, the vehicle behavior controller 310, the processor 320, the computer-readable medium 322, the communication module 324, the planner module 326, the locomotion module 328, the location module 340, and the onboard unit 330. The transceiver 332 is coupled to antenna 334. The transceiver 332 communicates with various other devices over a transmission medium. For example, the transceiver 332 may receive commands via transmissions from a user or a connected vehicle. In this example, the transceiver 332 may receive/transmit vehicle-to-vehicle traffic state information for the vehicle behavior controller 310 to/from connected vehicles within the vicinity of the car 350.

The vehicle behavior control system 300 includes the processor 320 coupled to the computer-readable medium 322. The processor 320 performs processing, including the execution of software stored on the computer-readable medium 322 to provide functionality according to the disclosure. The software, when executed by the processor 320, causes the vehicle behavior control system 300 to perform the various functions described for vehicle behavior control (e.g., vehicle merging control) of the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images. The second sensor 304 may be a ranging sensor, such as a light detection and ranging (Li-DAR) sensor or a radio detection and ranging (RADAR) sensor. Of course, aspects of the present disclosure are not limited to the aforementioned sensors as other types of sensors (e.g., thermal, sonar, and/or lasers) are also contemplated for either of the first sensor 306 or the second sensor 304.

The measurements of the first sensor 306 and the second sensor 304 may be processed by the processor 320, the sensor module 302, the vehicle behavior controller 310, the communication module 324, the planner module 326, the locomotion module 328, the onboard unit 330, and/or the location module 340. In conjunction with the computer-readable medium 322, the measurements of the first sensor 306 and the second sensor 304 are processed to implement the functionality described herein. In one configuration, the data captured by the first sensor 306 and the second sensor 304 may be transmitted to a connected vehicle via the transceiver 332. The first sensor 306 and the second sensor 304 may be coupled to the car 350 or may be in communication with the car 350.

The location module 340 may determine a location of the car 350. For example, the location module 340 may use a global positioning system (GPS) to determine the location of the car 350. The location module 340 may implement a dedicated short-range communication (DSRC)—compliant GPS unit. A DSRC—compliant GPS unit includes hardware and software to make the car 350 and/or the location module 340 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 332. For example, the communication module 324 may be configured to provide communication capabilities via different wireless protocols, such as 5G, WiFi, long term evolution (LTE), 4G, 3G, etc. The communication module 324 may also communicate with other components of the car 350 that are not modules of the vehicle behavior control system 300. The transceiver 332 may be a communications channel through a network access point 360. The communications channel may include DSRC, LTE, LTE-D2D, mmWave, WiFi (infrastructure mode), WiFi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communications, mmWave, WiFi (infrastructure mode), WiFi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The vehicle behavior control system 300 also includes the planner module 326 for planning a route and controlling the locomotion of the car 350, via the locomotion module 328 for autonomous operation of the car 350. In one configuration, the planner module 326 may override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle ("HAV") is an autonomous vehicle that is Level 3 or higher. Accordingly, in some configurations the car 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The vehicle behavior controller 310 may be in communication with the sensor module 302, the processor 320, the computer-readable medium 322, the communication module 324, the planner module 326, the locomotion module 328, the location module 340, the onboard unit 330, and the transceiver 332. In one configuration, the vehicle behavior controller 310 receives sensor data from the sensor module 302. The sensor module 302 may receive the sensor data from the first sensor 306 and the second sensor 304. According to aspects of the disclosure, the sensor module 302 may filter the data to remove noise, encode the data, decode the data, merge the data, extract frames, or perform other functions. In an alternate configuration, the vehicle behavior controller 310 may receive sensor data directly from the first sensor 306 and the second sensor 304 to determine, for example, input traffic data images.

Conventional machine learning techniques for vehicle control may use a network to select an appropriate vehicle control action from input data relative to the ego vehicle. During operation of the car 350, a selected speed/acceleration/steering angle of the controlled ego vehicle may be applied as a vehicle control action to perform a vehicle control maneuver. Unfortunately, conventional machine learning techniques do not identify correspondences between maneuvers computed at different points in time for motion planning or maneuvering of a controlled ego vehicle.

For example, when an autonomous vehicle (AV), such as the car 350, is driving on a roadway with multiple lanes, conventional approaches plan actions at discrete time intervals as determined by a vehicle perception system. The vehicle perception system can include a number of different sensors, such as cameras, a light detection and ranging (LIDAR) sensor or a radio detection and ranging (RADAR) sensor, sonar, or other like sensor. Unfortunately, conventional approaches of planning actions at discrete time intervals do not identify correspondences between maneuvers computed at the discrete time intervals during motion planning for maneuver of a controlled ego vehicle.

As shown in FIG. 3, the vehicle behavior controller 310 includes a vehicle perception module 312, a vehicle maneuver computation module 314, a vehicle maneuver compatibility module 316, and a vehicle control selection module 318. The vehicle perception module 312, the vehicle maneuver computation module 314, the vehicle maneuver compatibility module 316, and the vehicle control selection module 318 may be components of a same or different artificial neural network, such as a deep convolutional neural network (CNN). The vehicle behavior controller 310 is not limited to a CNN. The vehicle behavior controller 310 receives a data stream from the first sensor 306 and/or the second sensor 304. The data stream may include a 2D RGB image from the first sensor 306 and LIDAR data points from the second sensor 304. The data stream may include multiple frames, such as image frames of traffic data.

The vehicle maneuver computation module 314 may be configured to determine a set of potential driving maneuvers during motion planning of the car 350. In these aspects of the present disclosure, the vehicle maneuver computation module 314 is configured to compute possible maneuvers up to ten times per second during motion planning of the car 350. Once a set of potential vehicle maneuvers is computed, the vehicle maneuver compatibility module 316 identifies, for the set of potential vehicle maneuvers, a compatible vehicle maneuver from a set of previously performed vehicle maneuvers. Finding the temporal correspondence between potential vehicle maneuvers and previously performed vehicle maneuvers allows the vehicle control selection module 318 to provide extra continuity assurances for a selected vehicle control action to perform a selected vehicle maneuver. For example, a vehicle control behavior of the car 350 may be controlled by the vehicle behavior controller 310 in a manner for motion planning and maneuvering of the car 350 by using a corresponding driving maneuver.

Aspects of the present disclosure identify relevant correspondences and/or relationships between maneuvers in a drivable space computed at different times to improve motion planning of an autonomous vehicle (AV). The correspondences may be a fallback mechanism that provides extra continuity for a maneuver executed during operation of an ego vehicle. In some aspects of the present disclosure, improving temporal consistency of planned maneuvers may provide continuity for improved operator confidence during operation of the autonomous vehicle. In particular, these aspects of the present disclosure are directed to a fallback mechanism for providing extra continuity assurances for a selected driving maneuver during motion planning, for example, as shown in FIG. 4.

Figure 4:
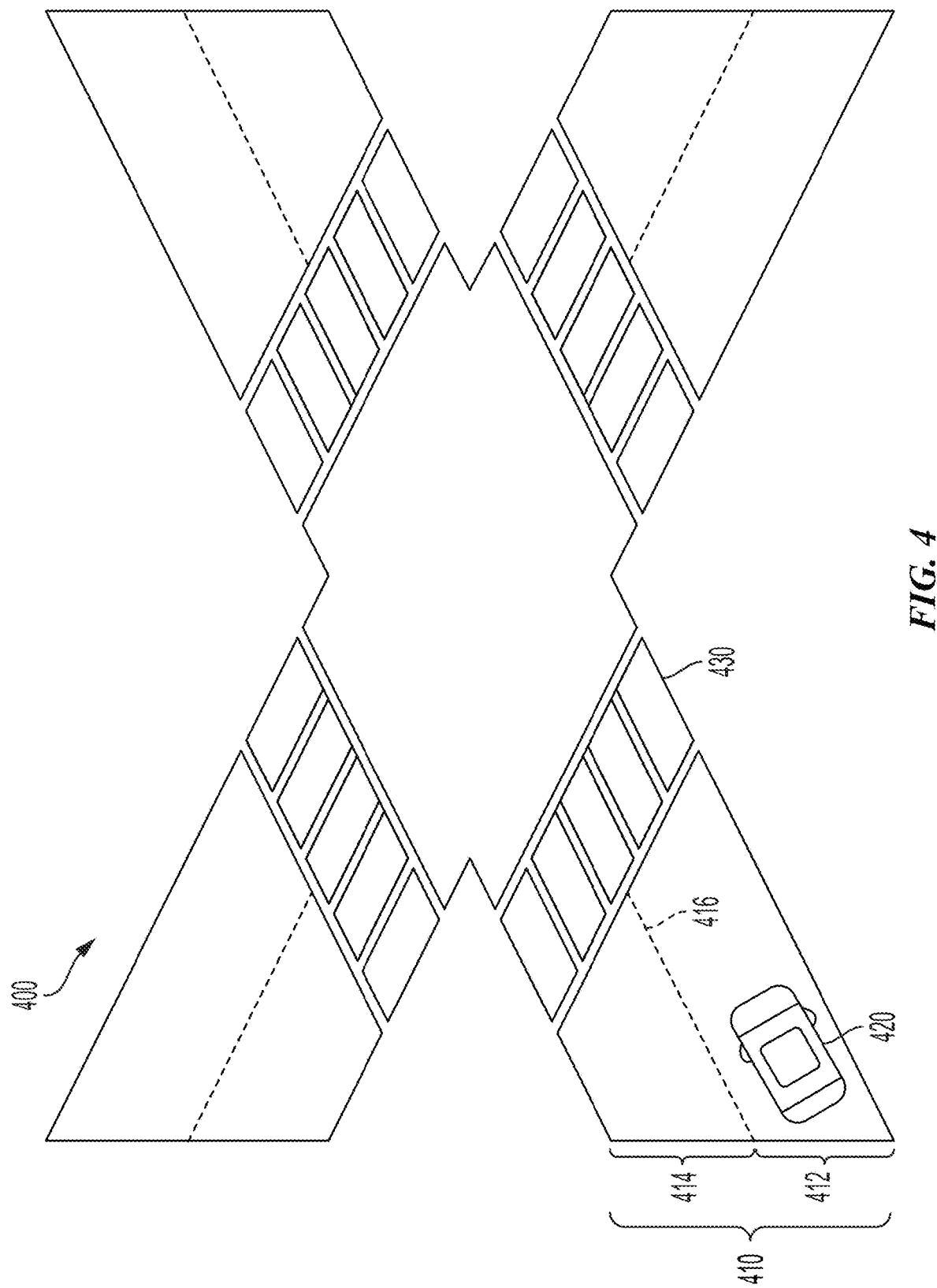
FIG. 4 is a diagram illustrating an overview of a roadway intersection, including crosswalks and a controlled ego vehicle in a first lane of the roadway, according to aspects of the present disclosure.

FIG. 4 is a diagram illustrating an overview of a roadway intersection, including crosswalks and a controlled ego vehicle in a first lane of the roadway, according to aspects of the present disclosure. In this example, a roadway intersection 400 includes a roadway 410, having a first lane 412 in which an ego vehicle 420 is traveling and approaching a crosswalk 430. In this example, the ego vehicle 420 is configured to monitor the dynamics of vehicles in the first lane 412, as well as vehicles in the second lane 414 of the roadway 410 including the center line 416. In addition, the ego vehicle 420 is configured to monitor the dynamics of any pedestrians in the crosswalk 430. In this example, the ego vehicle 420, may be the car 350, shown in FIG. 3.

In one aspect of the present disclosure, the ego vehicle 420 is essentially controlled by a vehicle controller (e.g., the vehicle behavior controller 310). In this example, the ego vehicle 420 (e.g., the vehicle perception module 312) identifies the crosswalk of the roadway 410. That is, the ego vehicle 420 is configured to identify correspondence between a set of potential vehicle maneuvers and a set of previously performed vehicle maneuvers to select a prioritized vehicle maneuver on the roadway 410. According to aspects of the present disclosure, the ego vehicle 420 is configured to improve temporal consistency of planned maneuvers and may provide continuity for improved operator confidence during operation of the ego vehicle 420.

In this example, the roadway 410 is shown with two lanes, in which the ego vehicle 420 is in the rightmost lane (e.g., the first lane 412), approaching the crosswalk 430, and the left lane (e.g., the second lane 414) is clear. During autonomous driving of the ego vehicle 420 on the roadway 410, the ego vehicle 420 computes possible vehicle maneuvers up to ten times per second. Identifying correspondences between possible vehicle maneuvers computed at different points in time is desired. Aspects of the present disclosure provide a method for computing correspondences between vehicle maneuvers, with a fallback mechanism that provides extra continuity guarantees for the maneuver being executed. In these aspects of the present disclosure, a vehicle maneuver is described by a drivable space (e.g., a drivable corridor) that is composed by sections of the available lanes. Given two sets of maneuvers M (e.g., the current maneuvers) and M' (e.g., the maneuvers computed at the previous time instance), a maneuver correspondence method may be performed as shown in FIG. 5.

Figure 5:
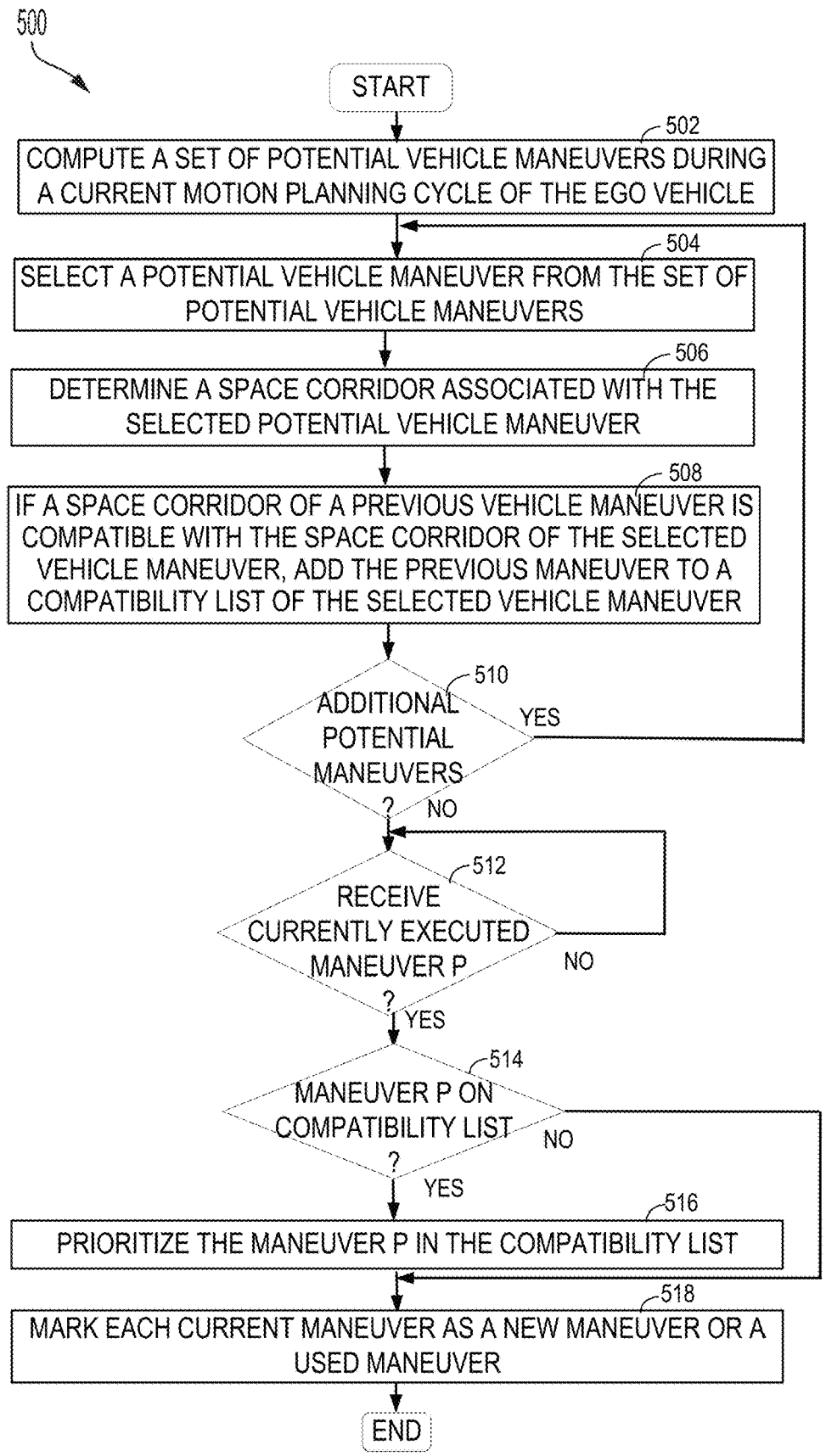
FIG. 5 is a flowchart illustrating a method of improving temporal consistency of planned maneuvers of a controlled ego vehicle, according to aspects of the present disclosure.
Figure 6:
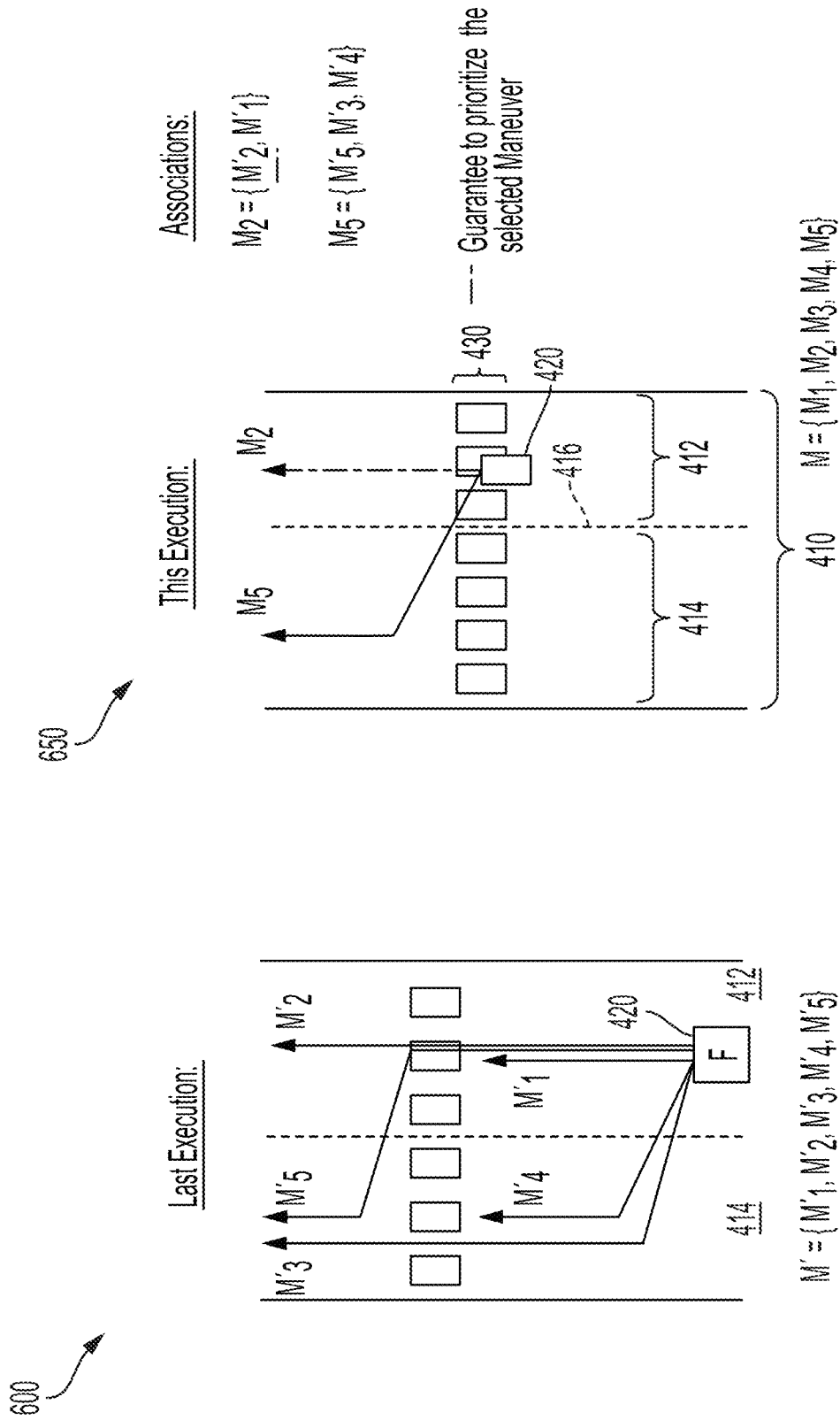
FIGS. 6A and 6B are block diagrams illustrating improvement of temporal consistency of planned maneuvers of a controlled ego vehicle using the process of FIG. 5, according to aspects of the present disclosure.

FIG. 5 is a flowchart illustrating a method 500 of improving temporal consistency of planned maneuvers of a controlled ego vehicle, according to aspects of the present disclosure. FIGS. 6A and 6B are block diagrams illustrating improvement of temporal consistency of planned maneuvers of a controlled ego vehicle using the process of FIG. 5, according to aspects of the present disclosure. For the purpose of autonomous driving, since many possible maneuvers are computed (e.g., up to 10 times per second) identifying correspondence between maneuvers computed at different points in time is desired. These aspects of the present disclosure compute maneuver correspondence as well as a fallback mechanism that provides extra continuity assurances for a maneuver being executed.

FIGS. 6A-6B illustrate two sets of maneuvers M 650 (e.g., the current maneuvers during this current execution) and maneuvers M' 600 (e.g., the maneuvers computed during the last execution). The roadway 410 is also shown with the ego vehicle 420 in the first lane 412, approaching the crosswalk 430, and the second lane 414 is clear. In these examples, a maneuver is described by a drivable space (e.g., a corridor) that is composed by sections of the available lanes (e.g., the first lane 412 and/or the second lane 414). Correspondence between the current maneuvers M 650 (e.g., M1, M2, M3, M4, M5) and the previous maneuvers M' 600 (e.g., M1', M2', M3', M4', M5') may be performed according to the process shown in FIG. 5.

At block 502, a set of potential vehicle maneuvers are computed during a current motion planning cycle of the ego vehicle. For example, as shown in FIG. 6B, a set of current maneuvers M 650 (e.g., M1, M2, M3, M4, M5) are computed for the ego vehicle 420. Although five maneuvers are shown, it should be recognized that fewer or an additional number of maneuvers are contemplated according to aspects of the present disclosure.

At block 504, a potential vehicle maneuver is selected from the set of potential vehicle maneuvers. For example, as shown in FIG. 6B, a current maneuver M2 is selected. At block 506, a space corridor associated with the selected vehicle maneuver is determined. For example, as shown in FIG. 6B, the selected maneuver M2 spans the first lane 412 and crosses the crosswalk 430 without changing into the second lane 414 or stopping before the crosswalk 430.

At block 508, if a space corridor of a previous vehicle maneuver is compatible with the space corridor of the selected vehicle maneuver, the previous maneuver is added to a compatibility list of the selected vehicle maneuver. According to these aspects of the present disclosure, two maneuvers are compatible if they span the same lanes and have corridors that are sufficiently close. In one approach, compatibility may be measured by the distance between the initial and final points. These aspects of the present disclosure sort the compatible maneuvers by corridor distance, as measured by the distance between the endpoints of the two corridors.

For example, as shown in FIGS. 6A and 6B, a space corridor of the previous maneuvers M2' and M3' are compatible with the space corridor of the selected vehicle maneuver M2. In particular, the previous maneuver M2' spans the first lane 412 and crosses the crosswalk 430 without changing into the second lane 414 or stopping before the crosswalk 430. Similarly, the previous maneuver M1' spans the first lane 412, but stops before the crosswalk 430 without changing into the second lane 414. As a result, a compatibility list of the current maneuver M2 includes previous maneuvers M2' and M1'.

At block 510, it is determined whether there are additional potential maneuvers in the set of current maneuvers M 650. If there are no additional maneuvers in the set of current maneuvers M 650, the method 600 process to block 512. Otherwise control flow branches to block 504, and blocks 504 to 508 are repeated until each of the current driving maneuvers in the current set of maneuvers M 650 are processed. For example, as shown in FIGS. 6A and 6B, the current maneuver M5 is generated having a compatibility list that includes previous maneuvers M5', M3', and M4'. As shown in FIG. 6B, the current maneuver M5 changes lanes from the first lane 412 to the second lane 414 at the crosswalk 430. Similarly, the previous maneuvers M5', M3', and M4' also change lanes from the first lane 412 to the second lane 414 either before or after the crosswalk 430.

At block 512, it is determined whether a currently executed maneuver P is received. The currently executed maneuver P may be one of the maneuvers from the set of previous maneuvers M' 600. For example, as shown in FIG. 6B, the previous maneuver M1' may be the currently executed maneuver P. At block 514, it is determined whether the currently executed maneuver P is on a compatibility list. As shown in FIG. 6A, the previous maneuver M1' is on the compatibility list of the current maneuver M2. If the currently executed maneuver P is not on a compatibility list, control flow branches to block 518. Otherwise, control flow branches to block 516.

At block 516, the currently executed maneuver is prioritized in the compatibility list. For example, as shown in FIG. 6B, the compatibility list of the current maneuver M2 would be modified such that the previous maneuver M1' is made the first maneuver in the compatibility list. Blocks 512 to 516 implement a fallback mechanism that provides an extra continuity assurance for the maneuver P being executed. In this way, an operator may have more confidence in automated vehicle maneuvers through the appearance of continuity.

At block 518, each current maneuver is marked as a new maneuver or a used maneuver. For example, a maneuver m in the current set of maneuvers M and a first previous maneuver m' in a compatible list that is not used to create a correspondence are identified. As described, creating a correspondence involves identifying compatible current maneuvers and previous maneuvers, for example, as shown in block 508. Once a compatible current maneuver m and a compatible previous maneuver m' are identified, an identification (ID) of the previous maneuver m' is assigned to the compatible current maneuver m. In addition, a tail of a drivable corridor of the previous maneuver m' may be stitched to a drivable corridor of the current maneuver m. As described, the tail of the drivable corridor may refer to the drivable space behind the controlled ego vehicle from the previous maneuver.

Referring again to block 518, if the previous maneuver m' exists, the current maneuver m and the previous maneuver m' may represent the same maneuver and the previous maneuver m' is marked as "used." Marking the previous maneuver m' as "used," prevents different IDs from being assigned to the same maneuver. If the previous maneuver m' does not exist, the current maneuver m is a new maneuver and assigned a unique ID.

As another example, a set of previous maneuvers (e.g., {M1, M2, M3, M4}) are computed at a previous time t−1, and a set of current maneuvers (e.g., {M5, M6, M7, M8}) are computed at a current time t. In this example, the previous maneuver M2 is the currently executed maneuver. During a first stage (e.g., block 508), lists of compatible maneuvers are computed and sorted for each of the current maneuvers (e.g., {M5, M6, M7, M8}) as follows:

$$M5 => \{M1, M2\} \quad (1)$$

$$M6 => \{M1, M3\} \quad (2)$$

$$M7 => \{M1, M3, M4, M2\} \quad (3)$$

$$M8 => \{M3, M1\} \quad (4)$$

Aspects of the present disclosure compute correspondences or relationships with a fallback procedure that provides extra continuity assurances for the maneuver being executed. During a second stage, this fallback procedure is performed. In this example, the previous maneuver M2 appears in the compatibility lists for current maneuvers M5 and M7, but the previous maneuver M2 is not the first element in any of these compatibility lists. Applying the fallback procedure results in the following transformations to re-sort the compatibility lists as follows:

$$M5 => \{M2, M1\} \quad (5)$$

$$M6 => \{M1, M3\} \quad (6)$$

$$M7 => \{M1, M3, M4, M2\} \quad (7)$$

$$M8 => \{M3, M1\} \quad (8)$$

In this way, an operator may have more confidence in an automated vehicle maneuver through the appearance of continuity. For example, if the currently executed maneuver M2 was completely missing from the compatibility lists, or if, for example, the compatibility list for the current maneuver list M7 includes the previous maneuver M2, as the first maneuver in the compatibility list (e.g., M7=>{M2,M3,M4,M1}), the fallback procedure is not applied because the previous maneuver M2 is either missing or is the top element for one of the compatibly lists.

For every maneuver m, the system finds the first old maneuver p in the compatibility list that hasn't yet been used to create a correspondence. If this maneuver exists, m and p may represent the same maneuver and p is marked as "used." If this maneuver doesn't exist, the system treats m like a new maneuver. During a third stage, the compatibility lists are processed in order to perform various associations. Accepted associations are marked in bold and "used" maneuvers are marked with strikethrough. Taking the first compatibility list of the current maneuver M5 (e.g., M5=>{ M2,M1}), the current maneuver M5 inherits the ID of M2. In addition, the other associations are updated as follows:

$$M6 => \{ \mathbf{M1}, M3 \} \quad (9)$$

$$M7 => \{ \cancel{M1}, M3, M4, \cancel{M2} \} \quad (10)$$

$$M8 => \{M3, \cancel{M1}\} \quad (11)$$

Taking the current maneuver M6 (e.g., M6=>{ M1,M3}), the current maneuver M6 inherits the ID of the previous maneuver M1, and the other associations are updated as follows:

$$M7 => \{ \cancel{M1}, \mathbf{M3}, M4, \cancel{M2} \} \quad (12)$$

$$M8 => \{ \mathbf{M3}, \cancel{M1} \} \quad (13)$$

Taking the current maneuver M7 (e.g., M7=>{ $\cancel{M1}$, M3,M4, $\cancel{M2}$ }), the current maneuver M7 inherits the ID of the previous maneuver M3, and the final association is updated as follows:

$$M8 => \{ \cancel{M3}, \cancel{M1} \} \quad (13)$$

Taking the current maneuver M8 (e.g., M8=>{ $\cancel{M3}$, $\cancel{M1}$ }), there's no valid association for the current maneuver M8, so a new ID is created and assigned to the new maneuver M8. These aspects of the present disclosure maintain consistent IDs for the various vehicle maneuvers. Maintaining consistent IDs provides a feeling of consistency for a human passenger, being in one maneuver for a certain period of time and then in the next maneuver. In other aspects of the present disclosure, labels are assigned to the vehicle maneuvers using human-readable names. For example, the following human-readable labels for the vehicles include, but are not limited to, Lane Change1, Lane Change2, Stop1, Stop2, Pass1, and the like. A process of improving temporal consistency of planned maneuvers of a controlled ego vehicle is further illustrated in FIG. 7.

Figure 7:
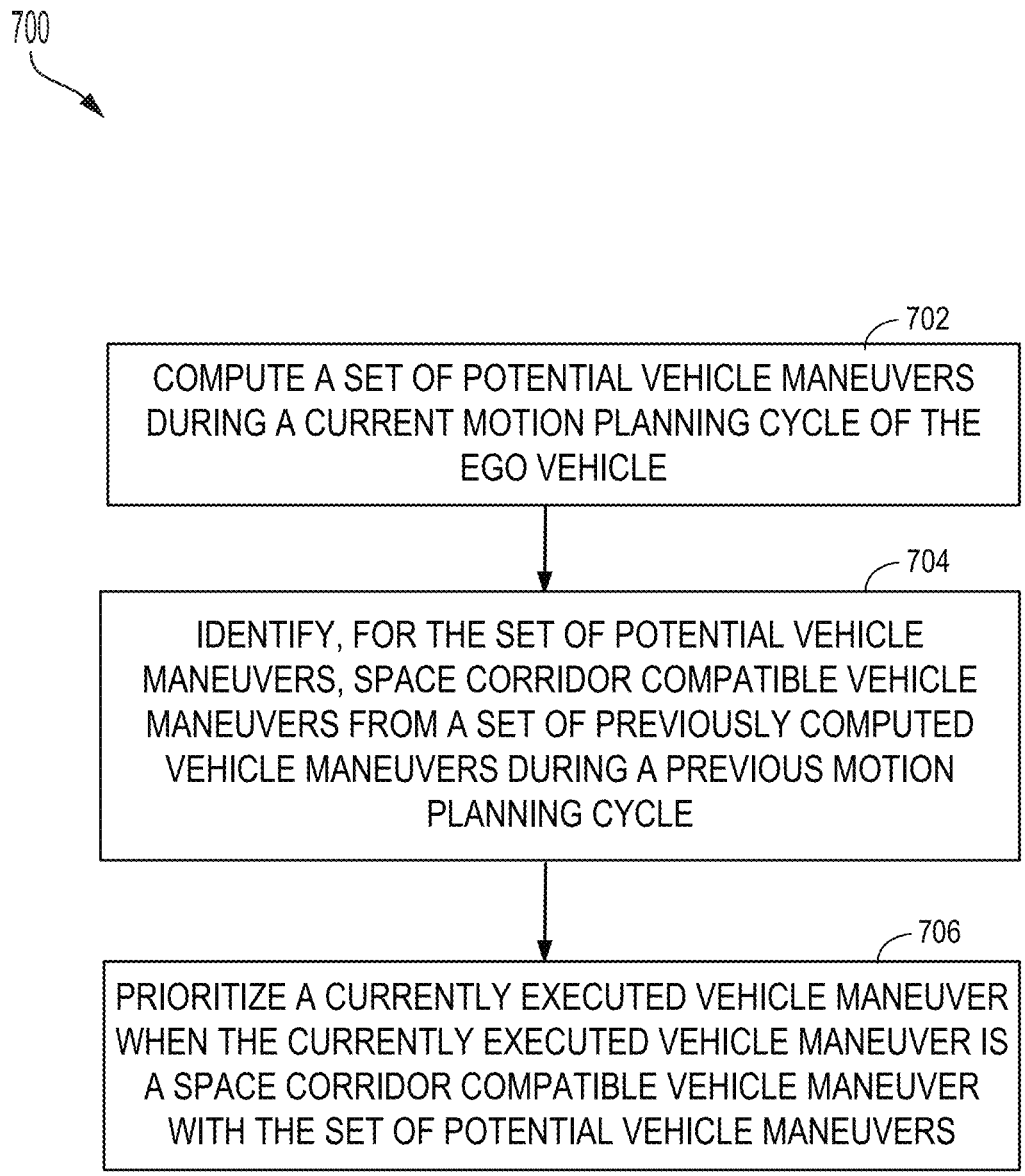
FIG. 7 is a flowchart illustrating a method of improving motion planning and maneuvering of an ego vehicle, according to aspects of the present disclosure.

FIG. 7 is a flowchart illustrating a method of improving motion planning and maneuvering of an ego vehicle, according to aspects of the present disclosure. A method 700 begins at block 702, in which a set of potential vehicle maneuvers is computed during a current motion planning cycle of the ego vehicle. For example, as shown in FIG. 6B, a set of current maneuvers M 650 (e.g., M1, M2, M3, M4, M5) are computed for the ego vehicle 420. Although five maneuvers are shown, it should be recognized that fewer or an additional number of maneuvers are contemplated according to aspects of the present disclosure.

At block 704, space corridor compatible vehicle maneuvers from a set of previously computed vehicle maneuvers during a previous motion planning cycle are identified for the set of potential vehicle maneuvers. For example, as shown in FIGS. 6A and 6B, a space corridor of the previous maneuvers M2' and M3' are compatible with the space corridor of the selected vehicle maneuver M2. In particular, the previous maneuver M2' spans the first lane 412 and crosses the crosswalk 430 without changing into the second lane 414 or stopping before the crosswalk 430. Similarly, the previous maneuver M1' spans the first lane 412, but stops before the crosswalk 430 without changing into the second lane 414. As a result, a compatibility list of the current maneuver M2 includes previous maneuvers M2' and M1'.

At block 706, a currently executed vehicle maneuver is prioritized when the currently executed vehicle maneuver is a space corridor compatible vehicle maneuver with the set of potential vehicle maneuvers. For example, as shown in FIG. 6B, the compatibility list of the current maneuver M2 would be modified such that the previous maneuver M1' is made the first maneuver in the compatibility list. Blocks 512 to 516 implement a fallback mechanism that provides an extra continuity assurance for the maneuver P being executed. In this way, an operator may have more confidence in automated vehicle maneuvers through the appearance of continuity.

The method 700 also includes sorting a set of potential vehicle maneuvers according to a corresponding drivable corridor to perform the potential vehicle maneuver. The method 700 further includes assigning an identification of the space corridor compatible vehicle maneuver from a set of previously performed vehicle maneuvers to the potential vehicle maneuver. For example, as shown in FIGS. 6A and 6B, for every maneuver m, the system finds the first old maneuver p in the compatibility list that hasn't yet been used to create a correspondence. If this maneuver exists, m and p may represent the same maneuver and p is marked as "used." If this maneuver doesn't exist, the system treats m like a new maneuver. During a third stage, the compatibility lists are processed in order to perform various associations. Accepted associations are marked in bold and "used" maneuvers are marked with strikethrough. Taking the first compatibility list of the current maneuver M5 (e.g., M5=>{M2,M1}), the current maneuver M5 inherits the ID of M2.

In some aspects, the methods shown in FIGS. 5 and 7 may be performed by the SOC 100 (FIG. 1) or the software architecture 200 (FIG. 2) of the autonomous vehicle 150. That is, each of the elements or methods may, for example, but without limitation, be performed by the SOC 100, the software architecture 200, the processor (e.g., CPU 102) and/or other components included therein of the autonomous vehicle 150, or the vehicle behavior control system 300.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method of motion planning and maneuvering of an ego vehicle, the method comprising:
    computing a set of potential vehicle maneuvers during a current motion planning cycle of the ego vehicle;
    selecting a potential vehicle maneuver from the set of potential vehicle maneuvers;
    determining a space corridor associated with the potential vehicle maneuver;
    identifying, for the potential vehicle maneuver, space corridor compatible vehicle maneuvers from a set of vehicle maneuvers computed during a previous motion planning cycle and a set of currently executed maneuvers;
    generating a compatibility list for the potential vehicle maneuver from the identified space corridor compatible vehicle maneuvers from the set of vehicle maneuvers computed during the previous motion planning cycle and the set of currently executed maneuvers;
    prioritizing a currently executed vehicle maneuver when the compatibility list of the potential vehicle maneuver includes the currently executed vehicle maneuver; and
    performing a vehicle control action to maneuver and control the ego vehicle to execute the prioritized potential vehicle maneuver.

2. The method of claim 1, further comprising repeating the selecting, determining, and adding for the set of potential vehicle maneuvers.

3. The method of claim 1, in which prioritizing comprises:
    receiving the currently executed vehicle maneuver;
    determining whether the currently executed vehicle maneuver is in the compatibility list of the potential vehicle maneuver; and
    moving the currently executed vehicle maneuver to a top of the compatibility list of the potential vehicle maneuver.

4. The method of claim 1, further comprising marking the set of potential vehicle maneuvers as a new maneuver or a used maneuver.

5. The method of claim 4, further comprising assigning a unique identification to each of the set of potential vehicle maneuvers marked as the new maneuver.

6. The method of claim 1, further comprising:
    sorting the set of potential vehicle maneuvers according to a corresponding drivable corridor to perform a potential vehicle maneuver; and
    assigning an identification of the space corridor compatible vehicle maneuver from the set of previously executed vehicle maneuvers to the potential vehicle maneuver.

7. A non-transitory computer-readable medium having program code recorded thereon for motion planning and maneuvering of an ego vehicle, the program code being executed by a processor and comprising:
    program code to compute a set of potential vehicle maneuvers during a current motion planning cycle of the ego vehicle;
    program code to select a potential vehicle maneuver from the set of potential vehicle maneuvers;
    program code to determine a space corridor associated with the potential vehicle maneuver;
    program code to identify, for the set of potential vehicle maneuver, space corridor compatible vehicle maneuvers from a set of vehicle maneuvers computed during a previous motion planning cycle and a set of currently executed maneuvers,
    program code to generate a compatibility list for the potential vehicle maneuver from the identified space corridor compatible vehicle maneuvers from the set of vehicle maneuvers computed during the previous motion planning cycle and the set of currently executed maneuvers;
    program code to prioritize a currently executed vehicle maneuver when the compatibility list of the potential vehicle maneuver includes the currently executed vehicle maneuver; and
    program code to perform a vehicle control action to maneuver and control the ego vehicle to execute the prioritized potential vehicle maneuver.

8. The non-transitory computer-readable medium of claim 7, further comprising repeating the program code to select, the program code to determine, and the program code to add for the set of potential vehicle maneuvers.

9. The non-transitory computer-readable medium of claim 7, in which the program code to prioritize comprises:
    program code to receive the currently executed vehicle maneuver;
    program code to determine whether the currently executed vehicle maneuver is in the compatibility list of the potential vehicle maneuver; and
    program code to move the currently executed vehicle maneuver to a top of the compatibility list of the potential vehicle maneuver.

10. The non-transitory computer-readable medium of claim 7, further comprising program code to mark the set of potential vehicle maneuvers as a new maneuver or a used maneuver.

11. The non-transitory computer-readable medium of claim 10, further comprising program code to assign a unique identification to each of the set of potential vehicle maneuvers marked as the new maneuver.

12. The non-transitory computer-readable medium of claim 7, further comprising:
    program code to sort the set of potential vehicle maneuvers according to a corresponding drivable corridor to perform a potential vehicle maneuver; and
    program code to assign an identification of the space corridor compatible vehicle maneuver from the set of previously executed vehicle maneuvers to the potential vehicle maneuver.

13. A system for motion planning and maneuvering of an ego vehicle, the system comprising:
    a memory; and
    a controller configured to:
        compute a set of potential vehicle maneuvers during a current motion planning cycle of the ego vehicle;
        selecting a potential vehicle maneuver from the set of potential vehicle maneuvers;
        determining a space corridor associated with the potential vehicle maneuver;
        identify, for the potential vehicle maneuver, space corridor compatible vehicle maneuvers from a set of vehicle maneuvers computed during a previous motion planning cycle and a set of currently executed maneuvers;
        generate a compatibility list for the potential vehicle maneuver from the, identified space corridor compatible vehicle maneuvers from the set of vehicle maneuvers computed during the previous motion planning cycle and the set of currently executed maneuvers;

prioritize a currently executed vehicle maneuver when the compatibility list of the potential vehicle maneuver includes the currently executed vehicle maneuver; and perform a vehicle control action to maneuver and control the ego vehicle to execute the prioritized vehicle maneuver.

14. The system of claim 13, in which the controller is further configured to mark the set of potential vehicle maneuvers as a new maneuver or a used maneuver, and to assign a unique identification to each of the set of potential vehicle maneuvers marked as the new maneuver.

15. The system of claim 13, further comprising a planner module to plan a trajectory of the ego vehicle according to the vehicle control action.

* * * * *